RING COUNTER CHECKING CIRCUIT

Filed March 19, 1962

INVENTOR
BERNARD SIMON
BY Joseph J. Connerton
ATTORNEY

United States Patent Office 3,237,158
Patented Feb. 22, 1966

3,237,158
RING COUNTER CHECKING CIRCUIT

Bernard Simon, Hurley, N.Y., assignor to International Business Machines Corporation, New York, N.Y., a corporation of New York Filed Mar. 19, 1962, Ser. No. 180,525
12 Claims. (Cl. 340—146.1)

Figure 1:
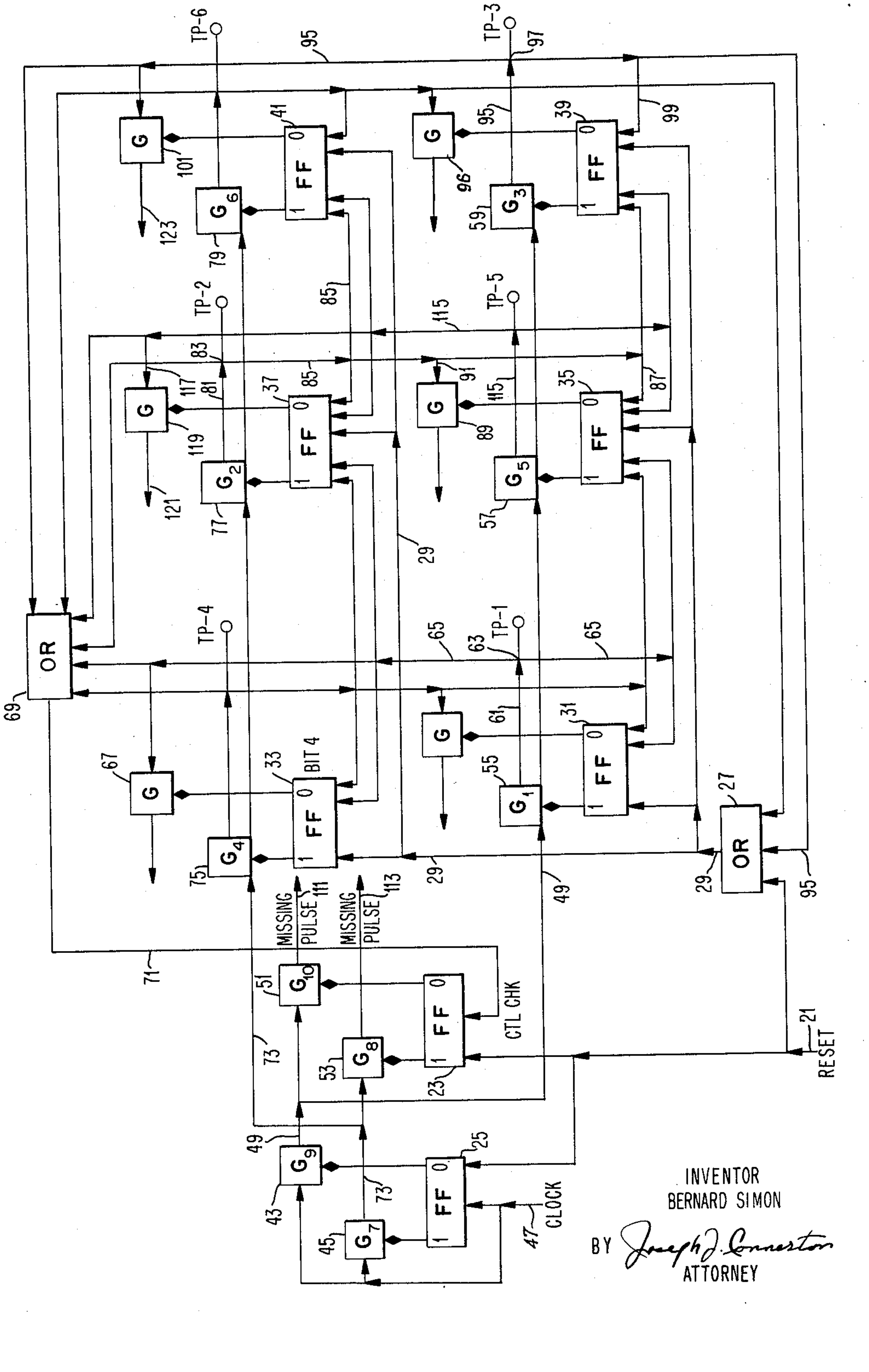

The present invention relates to checking circuitry and more particularly to a circuit for checking the condition and operation ot a ring counter.

Ring counters, including time pulse distributors, are generally composed of cascaded binary devices connected in a closed loop arrangement and are employed extensively in data processing systems to provide counting and timing functions. Time pulse distributors are employed to translate pulses from a single source such as a clock to each of a plurality of output conductors sequentially. The binary devices usually take the form of bistable flip-flop or trigger circuits which may be "set" in the one state or "reset" in the zero state. Such flip-flops are further susceptible to transition from one stable state to the other in response to each signal applied to the trigger or complement input.

In a digital computer, the pulses generated by a time pulse distributor may be employed directly or used to control signals which ultimately become operational commands and to execute or control execution of a group of commands which make up the particular instruction being performed by the computer. If any of these pulses are missing or if redundant or extraneous pulses are generated by the time pulse distributor, immediate indication of such errors is mandatory so that appropriate action may be taken before errors are introduced into the computation or data being processed.

In view of the importance of the problem, error detecting devices associated with ring counters are known in the art. For example, in U.S. application Serial Number 823,938, entitled "Error Check Circuit," filed by Arthur W. Heineck on June 30, 1959, now Patent No. 3,056,108, there is disclosed an error checking circuit for detecting extra or missing pulses from a time pulse distributor. While the invention disclosed therein will detect extra or missing pulses, it requires a substantial amount of checking circuitry, may not detect extraneous pulses and does not provide an immediate indication of an extra pulse condition. In contrast, the present invention provides an immediate indication of extra pulses generated and will detect the occurrence of a missing pulse during the ensuing pulse period before the absence of the pulse will cause an error using a minimal amount of extra equipment.

More specifically, the present invention is directed toward a circuit for checking that one and only one output pulse is generated in response to each applied clock pulse. Each bistable device in the ring has a pair of gates connected to its outputs, and the counter is interconnected in unique circuit configuration such that only half of the counter pulse generating gates are strobed or sampled by applied clock pulses, thereby effectively reducing the potential for generating extra or extraneous pulses by 50%. The bistable devices comprising the ring counter operate in pairs, i.e., two of said bistable devices are in the one state for each time pulse generated. Thus each bistable device for generating an odd timing pulse is associated with one generating an even timing pulse and vice versa such that in normal operation a pair of flip-flops are always "set" in the one state. Flip-flops so connected perform the dual function of generating time pulses as well as performing an error detection function. The timing pulse generated by one bistable device of each pair will check the state of the alternate bistable device and an associated gate circuit to ensure proper operation. Extraneous pulses will be detected by gate circuits associated with the half of the ring circuit not being sampled by the clock pulse, such gate circuits being conditioned by the zero output from their associated bistable device. Each clock pulse causes one timing pulse to be generated, sets the next pair of bistable devices to the one state, thus conditioning the gate circuit used to generate the ensuing time pulse, resets the pair of bistable devices generating the timing pulse and directs the generated time pulse back to complement a missing pulse check flip-flop. The missing pulse detector according to the present invention comprises a pair of flip-flops having associated gates on each output, the flip-flops being initially set and maintained in opposite states during normal operation. Each incoming clock pulse complements the first or control flip-flop while the associated flip-flop designated the missing pulse check flip-flop is complemented by the generated timing pulse. Failure to complement the missing pulse check flip-flop by the absence of a time pulse will maintain the flip-flop in step with the control flip-flop and this condition will be detected by the next clock pulse. Additional features in the present invention for detecting other possible error conditions arising from circuit or component failures will be described in detail in the ensuing description.

Accordingly, a primary object of the present invention is to provide an improved ring checking circuit.

Another object of the present invention is to provide an improved ring checking circuit adapted to detect missing or extra pulses.

Another object of the present invention is to provide an error checking ring counter adapted to provide an immediate indication of an extra pulse and a substantially immediate indication of a missing pulse.

Another object of the present invention is to provide an error checking ring counter in which the counter elements are interconnected in a unique circuit configuration to substantially reduce the potential for redundant pulse generation.

Still another object of the present invention is to provide a missing pulse detection circuit comprising a pair of bistable devices and associated gate circuits in which the bistable devices are maintained out of step in normal operation and a missing timing pulse condition, indicated by said pair of bistable devices being in step, is detected by the following clock pulse.

Another object of the present invention is to provide a ring counter checking circuit in which the ring counter is logically interconnected into odd and even halves which are sampled in sequence to generate the odd and even timing pulses.

The foregoing and other objects, features and advantages of the invention will be apparent from the following more particular description of a preferred embodiment of the invention.

The drawing illustrates a logical diagram of a preferred embodiment of the present invention.

Referring now to the drawing, a reset signal is initially applied to conductor 21 to "set" flip-flop 23 in the one state and "reset" flip-flop 25 in the zero state. The reset signal is also applied through OR circuit 27 and conductor 29 to "set" flip-flops 31 and 33 in the one state and "reset" flip-flops 35, 37 and 39, 41 in the zero state. Flip-flop 31, used with its associated gate circuit 55 to generate the first time pulse from the time pulse distributor, is operatively associated with flip-flop 33 used to generate time pulse 4. In like manner flip-flops 35 and 39, used to generate timing pulses 5 and 3 are operatively associated with flip-flops 37 and 41, used to generate timing pulses 2 and 6 respectively. In the preferred embodiment of the invention herein disclosed, a time pulse distributor of six stages will be illustrated and described. However, the principle of the present invention is equally applicable to any time pulse distributor, since the specific size of a time pulse distributor is a unique requirement of the computer with which it is associated.

After the reset pulse has set up the above-defined conditions, gate circuit 43 is conditioned by the zero output of flip-flop 25, while gate circuit 45, connected to the one output of flip-flop 25, is deconditioned. Upon receipt of the first clock pulse applied to line 47, flip-flop 25 will be set to its one state, gate circuits 43 and 45 will be sampled by the clock pulse and an output will be provided from gate circuit 43 on conductor 49, which output in turn will sample gate circuit 51. However, since flip-flop 23 is in the one state, gate circuit 51 is not conditioned and accordingly no output is obtained. The signal on line 49 is simultaneously applied to sample gate circuits 55, 57 and 59 connected to the one output of flip-flops 31, 35 and 39 associated with odd time pulses 1, 5 and 3 respectively. Since gate circuit 55 is conditioned by the one output from flip-flop 31 and assuming normal operation, the resultant output generated on line 61 is the first timing pulse labeled and hereafter designated TP–1. The TP–1 pulse is then applied from terminal 63 downward via line 65 to reset flip-flop 31 to the zero state and set flip-flop 35 in the one state, and applied upwardly from terminal 63 to reset flip-flop 33 in the zero state, set flip-flop 37 in the one state and sample gate circuit 67 which is connected to the zero output of flip-flop 33. Since this sampling takes place before flip-flop 33 is reset, no output is provided from gate circuit 67. It should be noted at this time that the technique of simultaneously causing transition of a flip-flop and sampling a gate conditioned by an output of this flip-flop before transition is known in the art as "pulse dodging," a recognized and well-known technique in the digital computer art. Finally, the TP–1 pulse is applied through OR circuit 69 and line 71 to complement flip-flop 23 to the zero state. It will be evident from the above description that flip-flops 23 and 25 are normally maintained in opposite states except for the interval between receipt of a clock pulse and application of the resultant timing pulse to complement flip-flop 23.

Following the above-described sequence, flip-flops 35 and 37 are set in the one state, gate circuits 57 and 77 are conditioned by the one output of flip-flops 35 and 37, the remaining counter flip-flops are reset in the zero state, while flip-flops 23 and 25 are in the zero and one state respectively. Upon receipt of the next clock pulse on line 47, an output is provided from gate 45, conditioned by the one output of flip-flop 25, and applied via line 73 to sample gate circuit 53. However, gate circuit 53 is not conditioned, since flip-flop 23 was reset in the zero state by TP–1. Simultaneously the signal on line 73 is applied to sample gate circuits 75, 77 and 79, associated with the one output from flip-flops 33, 37 and 41 respectively. Since flip-flop 37 is set in the one state, gate circuit 77 is conditioned and the second timing pulse generated from gate circuit 77 on line 81 labeled TP–2. This output will be applied from junction 83 downwardly through conductor 85 to reset flip-flops 37 and 35 to the zero state and set flip-flops 39 and 41 in the one state. Likewise, gate circuit 89 will be sampled by the signal on line 91 to check that flip-flop 35 is in the one state. However, since this sampling takes place before flip-flop 35 is reset, gate circuit 89 is not conditioned and no output is provided. Finally, the signal on line 81 is applied via line 115 through OR circuit 69 and line 71 to complement flip-flop 23 to the one state.

Following generation of TP–2, flip-flops 39 and 41 are "set" in the one state, while all remaining counter flip-flops are "reset" in the zero state. The next clock pulse applied to line 47 will be directed through gate circuit 43 and line 49 to sample gate circuits 51, 55, 57 and 59. Since gate circuit 59 is conditioned by the one output from flip-flop 39, a timing pulse output is generated on line 95 labeled TP–3. TP–3 is applied downwardly from junction 97 to "reset" flip-flop 39 to the zero state via line 99 and applied via OR circuit 27 and line 29 to "set" flip-flops 31 and 33 in the one state. The TP–3 output is applied upwardly through line 95 to sample gate circuit 101, conditioned by the zero output from flip-flop 41, and applied via line 103 to reset flip-flop 41 to the zero state. Finally the TP–3 output on line 95 is applied through OR circuits 69 and line 71 to complement flip-flop 23 to the zero state.

In this manner, each incoming clock pulse is directed through gate circuits 43 or 45 according to the state of control flip-flop 25 to the gate circuits associated with the odd or even flip-flops respectively. Each odd timing pulse complements flip-flop 23 to the zero state; each even timing pulse complements flip-flop 23 to the one state. Should a missing pulse condition occur within the time pulse distributor, the absence of the anticipated time pulse will cause flip-flop 23 to be maintained in its existing condition, i.e., in the same state as flip-flop 25, such that the next clock pulse on line 47 will pass through the conditioned one of gate circuits 51 or 53 to generate a missing pulse signal on line 111 or 113 respectively. Thus failure to complement control check flip-flop 23 by a time pulse will maintain flip-flop 23 in the same state as flip-flop 25, and this condition will always be detected by the succeeding time pulse.

Extra pulses are detected in the following manner. Since the ring counter flip-flops operate in pairs as heretofore described, only those gates associated with the one output of the activated pair of flip-flops should be conditioned, while the remaining gate circuits associated with the zero output of the non-activated flip-flops should be deconditioned. Assume, for example, that at TP–1 time, TP–5 is simultaneously generated. This condition could occur, for example, by failure of flip-flop 35 to reset to the zero state at TP–5 time, failure of flip-flop 35 such that both outputs are simultaneously "up" or a failure of gate circuit 57 in passing the clock pulse even though not conditioned when sampled at TP–1 time. If a TP–5 output is generated on line 115 coincident with the TP–1 output on line 61, the TP–5 output on line 115 will be applied via line 117 to sample gate circuit 119. Since gate circuit 119 is conditioned by the zero output from flip-flop 37, an output indicative of an extra pulse condition will be generated on line 121. Likewise, should a TP–3 pulse be generated on line 95 at TP–1 or TP–5 time, gate circuit 101 will be sampled by the TP–3 output on line 95 to provide an extra pulse indication on line 123, since gate circuit 101 is conditioned by the zero output of flip-flop 41. An identical circuit arrangement detects an extra pulse condition with respect to the even timing pulses. It should be noted that the routing arrangement employed whereby the clock pulses are alternately directed to the odd and even flip-flops assumes that any extra pulses generated correspond to the timing pulse generated, i.e., the extra pulse being generated will be odd or even depending on whether an odd or even time pulse is being generated, thus reducing the extra pulse potential of the counter by 50%. For example, in the illustrated embodiment, at TP–1 time, only TP–5 or TP–3 could generate extra pulses, since only the odd gates are sampled by a timing pulse on line 49 and there is no connection between conductor 49 and even flip-flops 33, 37 or 41 and their associated gates 67, 119 and 101 respectively. At TP–2 time only TP–4 or TP–6 could be generated, and so forth.

From the above description, it will be apparent that any flip-flop or gate circuit failure resulting in an extra pulse being generated will be detected no later than the next time the odd or even timing pulse is generated. For example, a failure of a flip-flop to reset will be detected the next time the associated gates are sampled, i.e., failure of the TP–2 flip-flop 37 to reset will be detected at TP–4 time. This interval, however, creates no problem since the failure of the flip-flop to reset will not affect the succeeding timing pulse and the error will be detected before any advantageous results are encountered.

Assuming a flip-flop fails in the off or down condition, this situation will be detected in the following manner. Assume, for example, that flip-flop 37 associated with TP–2 fails in the zero condition. Following TP–1 time, the output on line 65 will fail to "set" flip-flop 37 but will "set" flip-flop 35 associated with TP–5. At TP–2 time, no timing pulse will be generated, since gate circuit 77 is not conditioned, and accordingly no output will be provided through OR circuit 69 to complement flip-flop 23. Since flip-flops 23 and 24 will now be in step, the following clock pulse used to generate TP–3 will pass through gate circuit 45 and through gate circuit 53 to provide a missing pulse indication on line 113.

Assuming a counter gate circuit fails off, i.e., fails to condition or to pass a pulse when conditioned, this failure will be detected as a missing pulse indication when the appropriate timing pulse is not generated. Failure to generate the timing pulse will operate exactly as described above to provide a missing pulse indication by way of gate circuits 51 or 53. While this failure may not be detected until the associated timing pulse is to be generated, this presents no problem since no error is introduced prior to this time. Assuming failure of control flip-flops 25 or 23, failure of either will cause the flip-flops to be in step resulting in detection as a missing pulse condition on lines 111 and 113. This detection occurs on the clock pulse following failure. Failure of gate circuits 43 or 45 to pass a pulse will be detected as a missing pulse indication, since the timing pulse to complement flip-flop 23 will not be generated and the resulting "in step" condition of flip-flops 25 and 23 would be detected by gate circuits 51 or 53 as a missing pulse condition. Even the failure of OR circuit 27 will be detected in the following manner. For example, assume that at TP–3 time OR circuit 27 has failed. The TP–3 pulse will "reset" the TP–3 and TP–6 flip-flops 39 and 41 by way of line 95, junction 97 and lines 99 and 103 respectively. However, the output applied on line 95 to OR circuit 27 will not pass and accordingly, the bit 1 and 4 flip-flops 31 and 33 will remain in the zero state. Since none of flip-flops 33, 37 and 41 are "set" in the one state, the next clock pulse cannot pass, no output will be generated and accordingly flip-flop 23 will be in step with flip-flop 25 and be detected as a missing pulse condition on the next clock pulse. Likewise, a failure of OR circuit 69 to pass a signal will result in flip-flop 23 remaining in step with flip-flop 25 and therefore be detected as a missing pulse condition.

From the above description it will be appreciated that the present invention provides a unique ring counter and checking configuration adapted to detect any failure in the ring counter resulting in either missing or extra timing pulses being generated and provide an indication of either condition before an error can be introduced into the computation. The subject invention is particularly adapted to detect single errors or certain combinations of errors, since the chances of generating multiple simultaneous errors which escape detection is statistically insignificant. It is evident from the drawing and preceding description that only a nominal amount of additional hardware is required for error checking due to the unique counter configuration and the manner in which the counter components perform the dual role of counting and error detection. The only additional hardware required for the instant invention is one gate circuit per counter stage, and the input steering and missing pulse checking circuit comprising two flip-flops and four gate circuits. While not specifically shown, the error indicating outputs could be applied through a logical OR circuit to a common alarm circuit, or could be wired to an individual alarm circuit to more quickly identify the specific error involved.

Various "basic" circuits have been shown in block form in the drawings and described operationally in the specifications. While such circuits could comprise any circuit having the above-described characteristics, flip-flops, gate circuits and logical OR circuits are preferably those shown and described in copending application Serial Number 824,105, entitled "Asynchronous Multiplier," filed by Charles J. Tilton on June 30, 1959, now Patent No. 3,085,-747.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A ring counter checking circuit comprising in combination a plurality of bistable devices, a plurality of gate circuits associated with said bistable devices, means interconnecting said bistable devices and associated gate circuits into first and second substantially identical counting configurations, a source of clock pulses, means for alternately sampling the gate circuits in said first and second counting configurations with said clock pulses to generate odd and even timing pulses respectively, first circuit means for detecting the absence of a timing pulse, second circuit means for detecting the generation of an extra timing pulse and means responsive to said first and second circuit means for indicating an error condition.

2. A ring counter checking circuit as claimed in claim 1 wherein said first circuit means comprises a pair of bistable devices and associated gate circuits, one of said pair of bistable devices being controlled by said clock pulses, the other of said pair of bistable devices being controlled by said generated timing pulse, said pair of bistable devices being normally maintained in opposite states.

3. A ring counter checking circuit as claimed in claim 1 wherein said second circuit means for detecting the generation of an extra timing pulse includes certain of said plurality of gate circuits which are conditioned by the anticipated state of said associated bistable devices which are automatically sampled by the extra timing pulses to provide an extra pulse indication.

4. A time pulse distributor comprising a plurality of bistable devices, a plurality of gate circuits connected to the outputs of said bistable devices, a source of clock pulses, means for interconnecting said bistable devices and said gate circuits into first and second substantially identical logical configurations, and control means for alternately directing said clock pulses to sample all the gate circuits associated with said first logical configuration and all gate circuits associated with second logical configuration in sequence to generate odd and even timing pulses respectively.

5. A time pulse distributor as claimed in claim 4 wherein said control means comprises a bistable device and a pair of associated gate circuits, the state of said bistable device being successively reversed by each applied clock pulse to condition said associated gate circuits and thereby direct said clock pulse to the appropriate logical configuration.

6. A device of the character described in claim 5 further including a bistable device and an associated pair of gate circuits the state of said bistable device being successively reversed by each timing pulse, said gate circuits being alternately sampled by said clock pulses whereby failure of said bistable device to reverse its state conditions the associated gate circuit to provide a missing timing pulse indication.

7. A time pulse distributor error checking circuit comprising a ring counter,
said ring counter including a plurality of bistable devices,
a plurality of gate circuits associated with said bistable devices,
a source of clock pulses,
means interconnecting said bistable devices and associated gate circuits into first and second substantially identical counter circuit configurations,
means interconnecting said bistable devices in said first and second counter circuit configurations whereby pairs of said devices are successively actuated to generate each timing pulse,
control means for directing said clock pulses to the gate circuits associated with said first and second counter circuit configurations to generate odd and even timing pulses respectively in sequence,
first circuit means for detecting extra timing pulses,
second circuit means for detecting missing timing pulses
and means responsive to the absence of timing pulses or generation of extra timing pulses to activate said first and second circuit means.

8. A device of the character described in claim 7 wherein said second circuit means includes a bistable device and a pair of associated gate circuits,
said bistable device being controlled by each generated timing pulse and functioning with its associated gate circuits and said control means as a missing pulse detector.

9. A circuit adapted to detect the absence of a pulse from a sequence of regularly recurring pulses comprising a time pulse distributor,
said time pulse distributor comprising first and second substantially identical counter configurations connected in a closed ring arrangement,
each of said configurations comprising a plurality of bistable devices and associated gate circuits,
said configurations being so interconnected that each bistable device in said first configuration operates in association with a corresponding bistable device in said second configuration,
a source of clock pulses,
a control bistable device for sequentially directing each clock pulse to said first and second configurations to generate odd and even timing pulses respectively,
a bistable device and associated gate circuits,
the state of said bistable device being successively reversed in response to each generated timing pulse
and means responsive to said control bistable device for alternately sampling said gates associated with said last named bistable device whereby the absence of a timing pulse indicated by an output from one of said gate circuits provides a missing pulse indication.

10. A ring counter checking circuit for checking a train of repetitive and substantially uniformly spaced pulses comprising in combination a ring counter, said ring counter comprising
a plurality of bistable devices,
a plurality of gate circuits associated with each of said bistable devices,
a source of clock pulses, means interconnecting said bistable devices whereby said ring counter is divided into logical halves for generating odd and even timing pulses,
means for alternately sampling gate circuits associated with the odd and even halves of said ring counter to thus generate odd and even timing pulses in sequence,
first circuit means for checking that one timing pulse is generated in response to each clock pulse,
second circuit means for checking the generation of extraneous timing pulses
and means for indicating an error in response to the output from said first or second circuit means.

11. A time pulse distributor error checking circuit comprising
a plurality of bistable devices,
a plurality of gate circuits connected to the outputs of each of said bistable devices,
a source of clock pulses,
means interconnecting said bistable devices to operate in pairs such that two of said devices are in one stable state for each time pulse generation,
means for alternately sampling the gate circuits associated with the odd and even bistable devices with said clock pulses to generate odd and even timing pulses in sequence,
first circuit means for checking that a timing pulse is generated for each clock pulse,
second circuit means for checking that not more than one timing pulse is generated for each clock pulse,
said second circuit means comprising a plurality of gate circuits conditioned by the even or odd bistable devices other than the bistable device directly involved in generating the odd or even timing pulse respectively.

12. A time pulse distributor error checking circuit comprising
a plurality of bistable devices,
a plurality of gate circuits connected to the outputs of each of said bistable devices,
a source of clock pulses,
means interconnecting said bistable devices to operate in pairs such that two of said devices are in one stable state for each time pulse generation,
means for alternately sampling the gate circuits associated with the odd and even bistable devices with said clock pulses to generate odd and even timing pulses in sequence,
first circuit means for checking that a timing pulse is generated for each clock pulse,
said first circuit means including first and second bistable devices controlled by said clock and timing pulses respectively, whereby said bistable devices are normally maintained in opposite states
second circuit means for checking that not more than one timing pulse is generated for each clock pulse,
said second circuit means comprising a plurality of gate circuits conditioned by the bistable devices other than the bistable device directly involved in generating the odd or even timing pulse respectively.

References Cited by the Examiner

UNITED STATES PATENTS

| | | | |
|---|---|---|---|
| 2,823,856 | 2/1958 | Booth et al. | 235—174 |
| 3,088,095 | 4/1963 | Delmege | 340—146.1 |

ROBERT C. BAILEY, *Primary Examiner.*

MALCOLM A. MORRISON, *Examiner.*